United States Patent [19]

Kunishige et al.

[11] Patent Number: 4,828,383

[45] Date of Patent: May 9, 1989

[54] RANGE-FINDING OPTICAL SYSTEM

[75] Inventors: Keiji Kunishige; Hirofumi Tsuchida, both of Tokyo, Japan

[73] Assignee: Olympus Optical Co., Ltd., Tokyo, Japan

[21] Appl. No.: 928,451

[22] Filed: Nov. 10, 1986

[30] Foreign Application Priority Data

Nov. 11, 1985 [JP] Japan ................... 60-250945

[51] Int. Cl.⁴ .......................... G01C 3/10; G03B 3/00; G03B 13/20
[52] U.S. Cl. ........................ 356/1; 354/167; 354/403; 354/404; 250/216
[58] Field of Search ................. 356/1; 354/167, 403, 354/404, 408; 250/216

[56] References Cited

U.S. PATENT DOCUMENTS

| | | | |
|---|---|---|---|
| 4,313,654 | 2/1982 | Matsui et al. | 356/1 X |
| 4,419,574 | 12/1983 | Kawabata et al. | 250/216 X |
| 4,650,309 | 3/1987 | Ishida et al. | 354/408 |
| 4,688,919 | 8/1987 | Ogawa et al. | 354/403 |

FOREIGN PATENT DOCUMENTS

| | | | |
|---|---|---|---|
| 57-64204 | 4/1982 | Japan . | |
| 59-160129 | 9/1984 | Japan . | |
| 0194416 | 10/1985 | Japan | 354/403 |

Primary Examiner—Stephen C. Buczinski
Assistant Examiner—Linda J. Wallace
Attorney, Agent, or Firm—Cushman, Darby & Cushman

[57] ABSTRACT

A range-finding optical system comprising a light emitting element, a light projecting lens located in front of the light emitting element and serving to project the light emitted from the light emitting element onto an object, a light receiving element, a light receiving lens located in front of the light receiving element and serving to converge the light, which is emitted from the light emitting element and reflected by the object, onto the light receiving element, a member for interconnecting the light projecting lens and light receiving lens and for defining the distance therebetween, and a member for interconnecting the light emitting element and light receiving element and for defining the distance therebetween, the range-finding optical system being arranged that the displacement of the focus point of the photographic lens system to be caused by temperature variation is easily compensated by means of the difference between the coefficient of thermal linear expansion of the member for interconnecting the light projecting lens and light receiving lens and the coefficient of thermal linear expansion of the member for interconnecting the light emitting element and light receiving element without additionally adopting a particular member.

5 Claims, 6 Drawing Sheets

RANGE-FINDING OPTICAL SYSTEM

BACKGROUND OF THE INVENTION (a) Field of the invention:

The present invention relates to a range-finding optical system and, more particularly, to a range-finding optical system arranged to compensate the displacement of the focus point which occurs in a photographic lens system because of temperature variation.

(b) Description of the prior art:

In recent years, lenses made by molding of synthetic resin (hereinafter referred to as plastic lenses) are being widely used for photographic lens systems to be used with still cameras, video cameras, etc. This is because they have various merits which cannot be obtained from conventional glass lenses, for example, a lower cost of production, higher degre of freedom at the time of forming of aspherical surfaces, and so forth. However, as synthetic resin materials (i.e., plastic materials) generally have temperature coefficients of refractive index and coefficients of thermal linear expansion which are several ten times larger compared with optical glass materials, a large displacement of the focus point occurs when a plastic lens is used in a photographic lens system. Besides, when a camera body and lens holder are formed by using plastic materials, a displacement of the focus point is caused also by expansion and contraction of those members to be caused by temperature variation.

Figure 11:
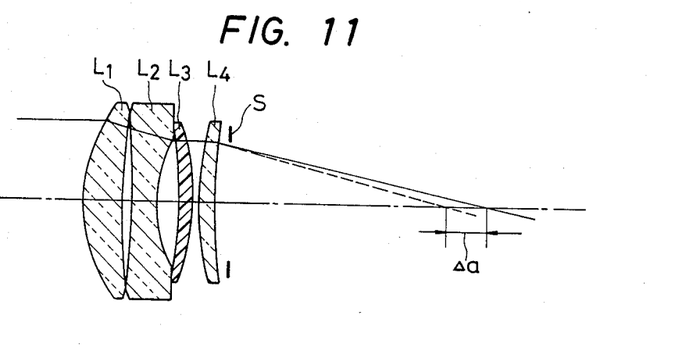
FIG. 11 shows a sectional view of an example of a photographic lens system for applying Embodiments 1 and 2 of the present invention.

For example, FIG. 11 shows an example of a photographic lens system to which the present invention is to be applied. In said figure, reference symbols $L_1$, $L_2$ and $L_4$ respectively represent glass lenses, reference symbol $L_3$ represents a plastic lens, and reference symbol S represents an aperture stop. In case of the above-mentioned photographic lens system, when the temperature decreases, the plastic lens $L_3$ causes such variation that the refractive index thereof becomes higher and, moreover, radii of curvature of the surfaces thereof become smaller. Chiefly as a result of the above-mentioned variation, the image point is displaced by $\Delta a$ toward the lens system compared with the case of normal temperature.

Figure 12:
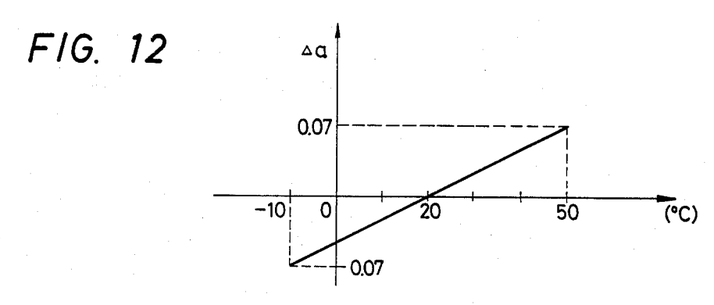
FIG. 12 shows a graph illustrating the displacement of the focus point of the lens system shown in FIG. 11 to be caused by temperature variation.

FIG. 12 shows the amount of displacement $\Delta a$ of the focus point which occurs in the temperature range of 50° C. to −10° C. when the photographic lens system shown in FIG. 11 is adjusted so that said lens system can be properly focused when the temperature is 20° C. As shown in said figure, the displacement $\Delta a$ of the focus point varies approximately linearly in relation to the temperature variation.

Figure 13:
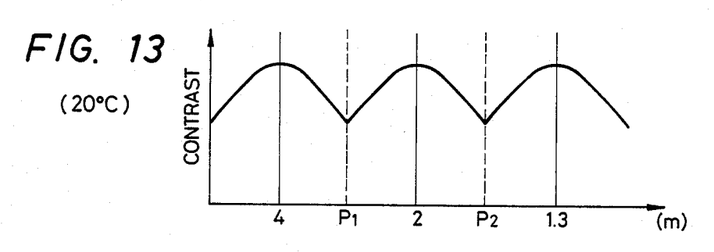
FIGS. 13 and 14 respectively show graphs illustrating the relation between the object distance and contrast of the image of the object of the lens system shown in FIG. 11.
Figure 14:
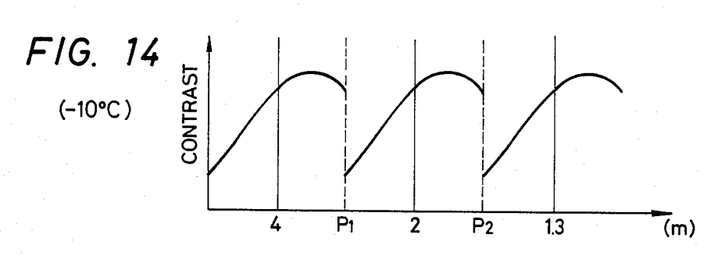

FIGS. 13 and 14 respectively show graphs illustrating the relation between the object distance and contrast of the image of the object in case of a camera arranged to perform automatic focusing of the photographic lens system thereof based on a detected signal from a focal point detecting system which is provided separately from the photographic lens system. For said photographic lens system, the zone focusing method is adopted, i.e., the photographic lens system is driven so that it stops at positions where the lens system is correctly focused on a particular object at the object distances of 1.3 m, 2 m and 4 m respectively and, at respective stopping positions, the photographic lens system covers the zones of object distances respectively from the shortest object distance up to $P_1$, from $P_1$ up to $P_2$ and from $P_2$ up to the infinite object distance by dividing the whole range of object distance into those three zones. In FIGS. 13 and 14, the axis of abscissa is graduated that the reciprocals of respective object distances come to positions at regular intervals.

As it is evident from FIG. 13, at the normal temperature (20° C., the contrast of the image of the object becomes the most favourable at the object distances of 1.3 m 2 m and 4 m respectively and, at each of the boundary points $P_1$ and $P_2$, the contrast becomes equal to that of the adjacent zone. However, when the temperature decreases to the low temperature (−10° C.), the focus point of the photographic lens system is displaced (by −0.07 mm) as shown in FIG. 12 and, consequently, the object distance at which the most favourable contrast is obtained on the surface corresponding to the film surface somewhat shifts toward the short object distance side in each of said zones. As a result, a range where the contrast of the image of the object becomes considerably unfavourable appears on the long object distance side in each zone and, therefore, it is impossible to obtain a photograph with a sharp image.

To solve the above-mentioned problem, Japanese published unexamined patent application No. 64204/82 proposes a means arranged that a temperature detecting element is provided to a camera and, by compensating the distance data based on the temperature data from said detecting element, the positions of the boundary points $P_1$ and $P_2$ between respective zones are somewhat shifted, in other words, the stopping positions of the photographic lens system is changed over at positions of object distances somewhat shorter than those of the normal temperature. Besides, Japanese published unexamined patent application No. 160129/84 proposes a method to shift the change-over points of the positions of the photographic lens system by varying the optical alignment of the range-finding device by using a bimetal member.

However, the above-mentioned known means and method have disadvantages that it is necessary to additionally provide a new and particular member exclusively for the purpose of compensation of the focus point to be caused by temperature variation and, therefore, the cost of production becomes high.

SUMMARY OF THE INVENTION

It is, therefore, a primary object of the present invention to provide a range-finding optical system which makes it possible to compensate the displacement of the focus point over a wide range of temperature and wide range of object distance without employing an additional or particular member for the purpose of compensation of the displacement of the focus point in spite of the fact that said range-finding optical system is arranged to be simple in the structure thereof and low in the cost.

The present invention relates to a range-finding optical system arranged that the light emitted from a light emitting element is projected onto an object through a light projecting lens and the reflected light from the object is converged onto a light receiving element by means of a light receiving lens and, to attain the above-mentioned object of the present invention, the range-finding optical system according to the present invention is arranged as described below. That is, a member thereof which defines the distance between the light emitting element and light receiving element and at least one member thereof which defines the distance between the light projecting lens and light receiving lens are arranged that the thermal expansion and contraction of the former in the base length direction thereof do not exert an influence on the thermal expansion and contraction of the latter in the base length direction thereof and vice versa. Besides, it is arranged that at least one member mentioned in the above which defines the distance between the light projecting lens and light receiving lens has a coefficient of thermal linear expansion which is different from the coefficient of thermal linear expansion of the above-mentioned member which defines the distance between the light emitting element and light receiving element, the range-finding optical system according to the present invention being thereby arranged that the displacement of the focus point of the photographic lens system to be caused by temperature variation is compensated by means of variation of the difference between the distance between the light projecting lens and light receiving lens and the distance between the light emitting element and light receiving element to be caused by thermal expansion and contraction.

For the range-finding optical system according to the present invention composed as described in the above, the basic principle for compensation of the already described displacement of the focus point of the photographic lens system to be caused by temperature variation is described below referring to the accompanying drawings.

Figure 9:
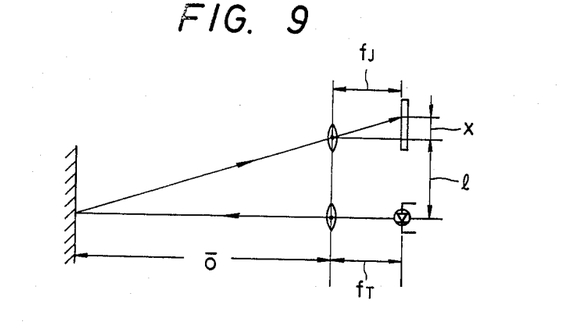
FIG. 9 shows a figure illustrating the principle of the trigonometrical survey method.
Figure 10:
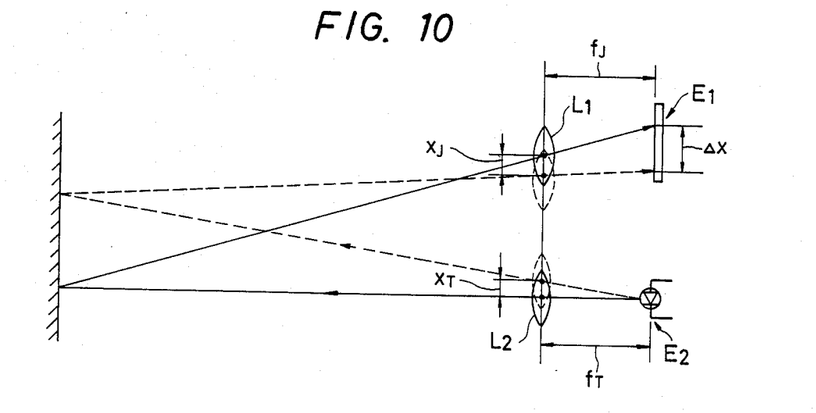
FIG. 10 shows a figure illustrating the relation of the amount of relative variation of the distance between the light receiving lens and light projecting lens and distance between the light receiving element and light emitting element in respect to the amount of displacement of the center position of the light spot on the light receiving surface of the light receiving element.

FIGS. 9 and 10 show the relation between the amount of displacement $\Delta a$ of the focus point of the photographic lens system, respective parameters of the range-finding optical system (the distance $f_T$ between the principal point of the light projecting lens and light emitting surface of the light emitting element, distance $f_J$ between the principal point of the light receiving lens and light receiving surface of the light receiving element, base length $l$, and focal length $f_S$ of the photographic lens system), and center position $x$ of the light spot on the light receiving surface of the light receiving element.

The lens advancing amount $a$ of the photographic lens system for the purpose of focusing is expressed by the formula (1) shown below:

$$a \approx f_S^2/\overline{o} \qquad (1)$$

where, reference symbol $\overline{o}$ represents the distance from the front surface of the lens to an object.

On the other hand, as it will be understood from FIG. 9, the center position $x$ of the light spot on the light receiving surface of the light receiving element is given by the formula (2) shown below based on the principle of the trigonometrical survey method.

$$x = \frac{l \cdot f_J}{o} \qquad (2)$$

From the formulae (1) and (2), the relation expressed by the formula (3) shown below is obtained between the lens advancing amount $a$ of the photographic lens system and center position $x$ of the light spot on the light receiving surface of the light receiving element.

$$a \approx \frac{f_S^2}{l \cdot f_J} \cdot x \qquad (3)$$

Therefore, between the amount of displacement $\Delta a$ of the focus point of the photographic lens system and amount of displacement $\Delta x$ of the center position of the light spot on the light receiving surface of the light receiving element, there exists a relation expressed by the formula (4) shown below.

$$\Delta a \approx \frac{f_S^2}{l \cdot f_J} \cdot \Delta x \qquad (4)$$

When it is supposed that, as shown in FIG. 10, the distance between the light receiving lens $L_1$ and light projecting lens $L_2$ and distance between the light receiving element $E_1$ and light emitting element $E_2$ vary and that the light receiving lens $L_1$ and light receiving element $E_1$ are relatively displaced by $x_J$ and the light projecting lens $L_2$ and light emitting element $E_2$ are relatively displaced by $x_T$ from the correlation shown by solid lines to the correlation shown by broken lines as a result of the variation of the above-mentioned distances, the amount of displacement $\Delta x$ of the light spot on the light receiving surface of the light receiving element is given by the formula (5) shown below.

$$\Delta x \approx x_J + x_T \cdot \frac{f_T}{f_J} \qquad (5)$$

When $f_T = f_J$ here, the formula (6) shown below is obtained from the formula (5).

$$\Delta x \approx x_J + x_T \qquad (6)$$

In other words, the amount of displacement $\Delta x$ of the light spot on the light receiving surface of the light receiving element becomes equal to the amount of relative variation of the distance between the light receiving lens $L_1$ and light projecting lens $L_2$ and distance between the light receiving element $E_1$ and light emitting element $E_2$.

Therefore, when the range-finding optical system is composed so that said amount of relative variation fulfills the relation expressed by the formula (4), it is possible to automatically compensate the displacement of the focus point. The above-mentioned purpose will be attained when the range-finding optical system is composed so that the coefficient of thermal linear expansion related to the medium between the light receiving lens and light projecting lens (the member which defines the distance between said lenses) is different from the coefficient of thermal linear expansion of the medium between the light receiving element and light emitting element (the member which defines the distance between said elements) and, moreover, so that the thermal expansion and contraction of the former medium in the base length direction thereof are performed independently of the the thermal expansion and contraction of the latter medium in the base length direction thereof without exerting an influence on each other.

DETAILED DESCRIPTION OF THE PREFERRED EMBODIMENTS

Now, preferred embodiments of the range-finding optical system according to the present invention are shown below.

Figure 1:
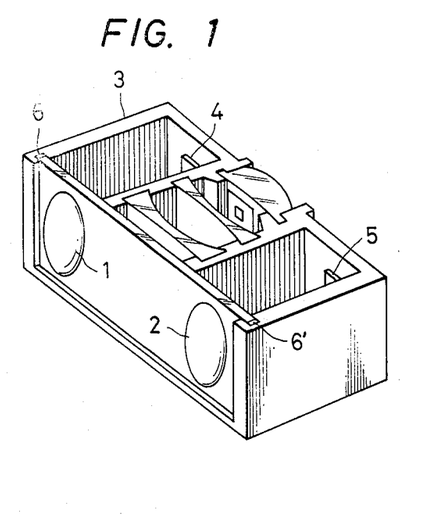
FIG. 1 shows a perspective view of Embodiment 1 of the range-finding optical system according to the present invention.
Figure 2:
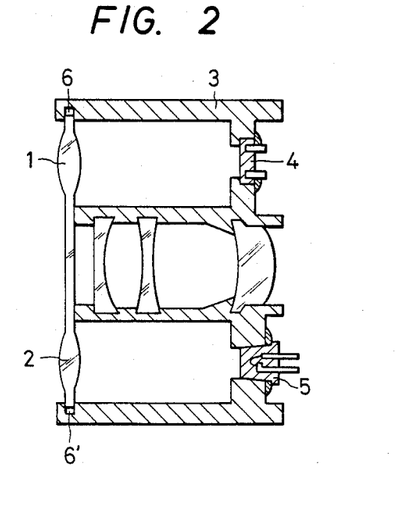
FIG. 2 shows a sectional view of Embodiment 1 of the present invention.

Embodiment 1 of the range-finding optical system according to the present invention is outlined in FIGS. 1 and 2. Out of them, FIG. 1 shows a perspective view and FIG. 2 shows a sectional view. In said figures, numeral 1 designates a light receiving lens and numeral 2 designates a light projecting lens. As illustrated in said figures, the light receiving lens and light projecting lens are formed to be integral with each other and mounted to a frame 3 at mounting portions where gaps 6 and 6' are provided. Therefore, the light receiving lens and light projecting lens are held in the state that they are free from a restriction in the base length direction to be caused by the frame 3. Consequently, the coefficient of thermal linear expansion of the medium which defines the distance between the light receiving lens 1 and light projecting lens 2 becomes equal to the coefficient of thermal linear expansion of the material of the medium or portion between the light receiving lens 1 and light projecting lens 2, for example, said coefficient becomes $7.0 \times 10^{-5}/°C$. in case that said material is PMMA (polymethylmethacrylate). Besides, numeral 4 designates a light receiving element such as a semi-conductor position sensing device (PSD), numeral 5 designates a light emitting element such as an infrared light emitting diode (IRLED), and they are respectively fixed to the frame 3 by a suitable means such as a binding agent. Therefore, the coefficient of thermal linear expansion of the medium or portion which defines the distance between the light receiving element 4 and light emitting element 5 becomes equal to the coefficient of thermal linear expansion of the material of the frame 3, for example, said coefficient becomes $3.4 \times 10^{-5}/°C$. in case that said material is polycarbonate (reinforced with fiberglass not exceeding 10%).

Here, Embodiment 1 is arranged that the distance between the light receiving lens 1 and light projecting lens 2, i.e., the base length l, becomes 43.7 mm at the normal temperature (20° C.). Therefore, at $-10°$ C., the deviation $\Delta$ between the distance between the light receiving lens 1 and light projecting lens 2 and distance between the light receiving element 4 and light emitting element 5 becomes as shown below.

$$\Delta = (7.0 \times 10^{-5} - 3.4 \times 10^{-5}) \times (-10 - 20) \times 43.7 \approx -0.047 \text{ (mm)}$$

When $f_T = f_J = 17.6$ mm, based on the formula (6), the center position of the light spot on the light receiving surface of the light receiving element is displaced by 0.047 mm toward the infinite distance side as shown in FIG. 10 from the center position at the normal temperature. In case that a lens system having a lens configuration as shown in FIG. 11 is used as the photographic lens system, the amount of displacement of the focus point of the photographic lens system becomes $-0.07$ mm at the time of $-10°$ C. Therefore, the amount of displacement $\Delta x$ of the center position of the light spot on the light receiving surface of the light receiving element which is required at that time is obtained from the formula (4) as shown below in case that $f_S = 33.8$ mm.

$$\Delta x = \frac{43.7 \times 17.6}{(33.8)^2} \times (-0.07) \approx -0.047 \text{ (mm)}$$

As shown in the above, $\Delta x$ satisfactorily coincides with the amount of shifting of the center position of the light spot on the light receiving surface of the light receiving element which occurs in the range-finding optical system because of temperature variation and, therefore, it is possible to favourably compensate the displacement of the focus point.

Figure 3:
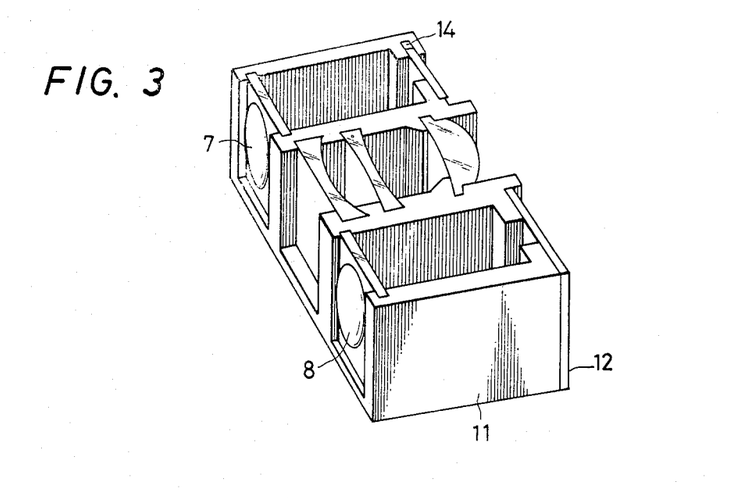
FIG. 3 shows a perspective view of Embodiment 2 of the present invention.
Figure 4:
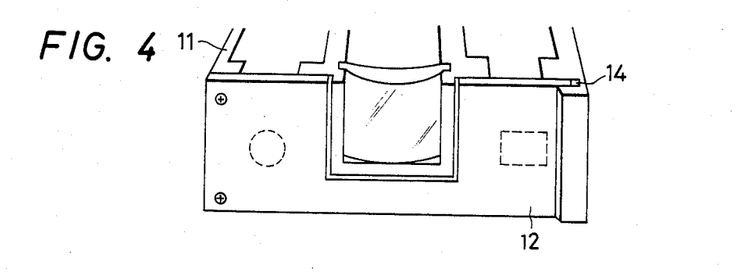
FIG. 4 shows a perspective view of Embodiment 3 of the present invention seen from the rear side thereof.
Figure 5:
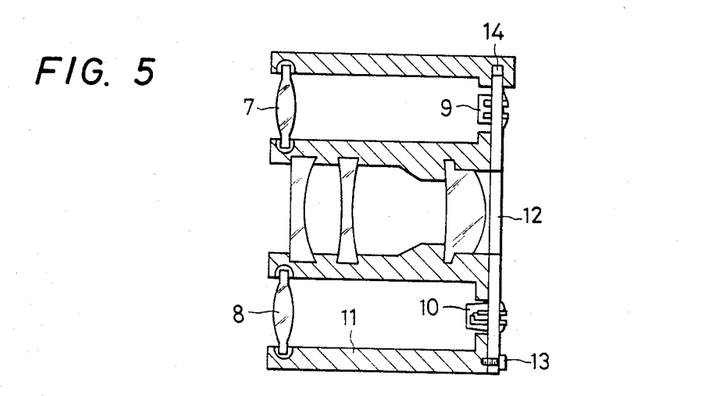
FIG. 5 shows a sectional view of Embodiment 2 of the present invention.

Embodiment 2 of the present invention is shown in FIGS. 3, 4 and 5. Out of them, FIG. 3 shows a perspective view, FIG. 4 shows a perspective view seen from the rear side of Embodiment 2, and FIG. 5 shows a sectional view. Said Embodiment 2 is also arranged to apply the present invention to the photographic lens system having the lens configuration as shown in FIG. 11.

In FIGS. 3, 4 and 5, numeral 7 designates a light receiving lens, numeral 8 designates a light projecting lens, numeral 9 designates a light receiving element such as a semi-conductor position sensing device (PSD), and numeral 10 designates a light emitting element such as an infrared light emitting diode.

In said Embodiment 2, the light receiving lens 7 and light projecting lens 8 are respectively fixed to a frame 11 by a suitable means such as a binding agent. On the other hand, the light receiving element 9 and light emitting element 10 are respectively fixed to a plate-like member 12 made, for example, of fiberglass reinforced epoxy by a suitable means such as a binding agent so that each of said elements becomes integral with the plate-like member 12. Said plate-like member 12 is mounted to the frame 11 in the state that one end thereof is fixed to the frame 11 by screws 13 while the other end thereof is held so as to leave a gap 14 in respect to the frame 11. In other words, the plate-like member 12 is held in the state that it is free from a restriction in the base length direction to be caused by the frame 11. Therefore, the coefficient of thermal linear expansion of the medium or portion which defines the distance between the light receiving element 9 and light emitting element 10 becomes equal to the coefficient of thermal linear expansion of the material of the plate-like member 12, for example, it becomes $3.0 \times 10^{-5}/°C$. in case that said material is fiberglass reinforced epoxy. On the other hand, as the light receiving lens 7 and light projecting lens 8 are respectively fixed to the frame 11 so that each of them becomes integral with the frame, the coefficient of thermal linear expansion of the medium or portion which defines the distance between the light receiving lens 7 and light projecting lens 8 becomes equal to the coefficient of thermal linear expansion of the material of the frame 11, for example, it becomes $6.6 \times 10^{-5}/°C$. in case that said material is polycarbonate (which is not reinforced with fiberglass). Therefore, at $-10°$ C., the deviation $\Delta$ between the distance between the light receiving lens 7 and light projecting lens 8 and distance between the light receiving element 9 and light emitting element 10 becomes as shown below.

$$\Delta = (6.6 \times 10^{-5} - 3.0 \times 10^{-5}) \times (-10 - 20) \times 43.7 \approx -0.047 \text{ (mm)}$$

Therefore, it is possible to compensate the displacement of the focus point favourably in the same way as the case of Embodiment 1.

Figure 6:
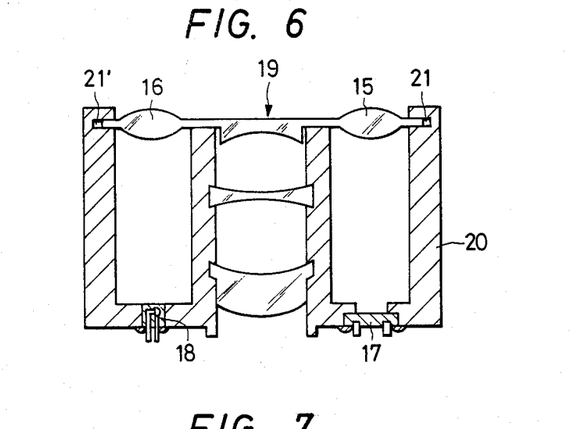
FIG. 6 shows a sectional view of Embodiment 3 of the present invention.
Figure 15:
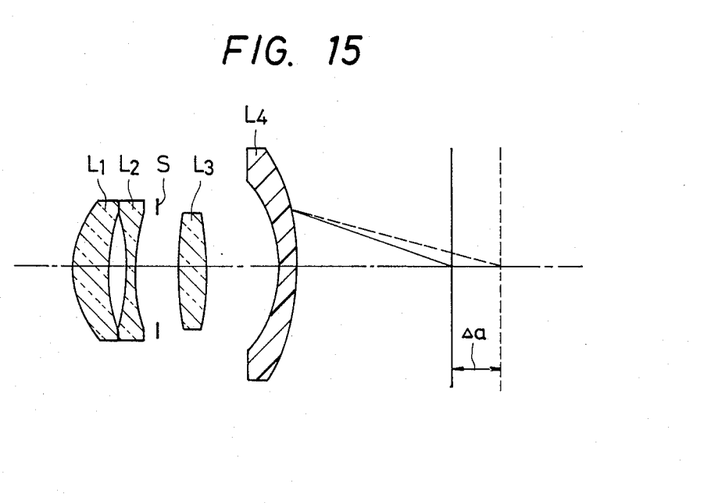
FIG. 15 shows a sectional view of an example of a photographic lens system for applying Embodiments 3 and 4 of the present invention.

FIG. 6 shows a sectional view of Embodiment 3 of the present invention. Said Embodiment 3 is arranged to be applied to a photographic lens system with a lens configuration as shown in FIG. 15, i.e., a lens system comprising glass lenses $L_1$, $L_2$ and $L_3$ and a plastic lens $L_4$ which is formed as a negative lens.

Figure 16:
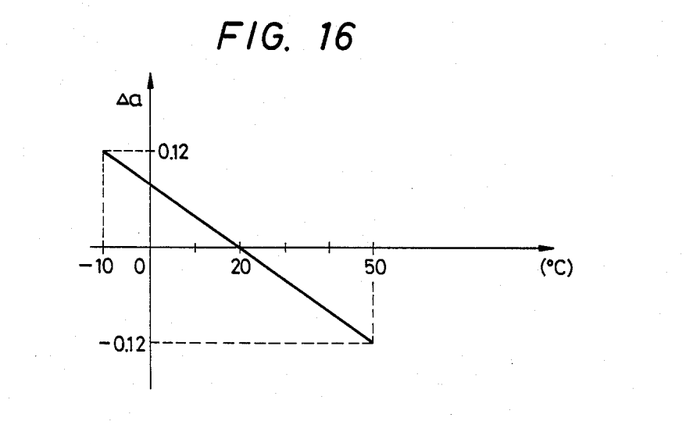
FIG. 16 shows a graph illustrating the displacement of the focus point of the lens system shown in FIG. 15 to be caused by temperature variation.

In case of the above-mentioned photographic lens system, as the temperature decreases, the plastic lens $L_4$ causes such variation that the refractive index thereof becomes higher and radii of curvature of the surfaces thereof become smaller and, as a result, the lens system causes a displacement of the focus point. However, the direction of said displacement is inverse to the direction of the focus point caused by the photographic lens system shown in FIG. 11. That is, by temperature variation, the photographic lens system shown in FIG. 15 causes a displacement of the focus point as shown in FIG. 16, and the back focal length thereof becomes longer as the temperature decreases. Generally, camera bodies made of synthetic resins cause such variation that the distance between the lens system and film surface becomes shorter as the temperature decreases. Therefore, when the photographic lens system shown in FIG. 15 is adopted, the displacement of the focus point becomes larger and more serious compared with the case of the photographic lens system shown in FIG. 11. Embodiment 3 shown in FIG. 6 is to be applied to a photographic lens system which causes a displacement of the focus point as shown in FIG. 16.

In FIG. 6, numeral 15 designates a light receiving lens, numeral 16 designates a light projecting lens, numeral 17 designates a light receiving element, and numeral 18 designates a light emitting element. The light receiving lens 15 and light projecting lens 16 are formed to be integral with a negative lens, which constitutes a finder optical system, as illustrated by a member designated by numeral 19. The member 19 is held in the state that gaps 21 and 21' are provided in respect to the frame 20 so as to permit the member 19 to freely expand and contract in the base length direction. Therefore, the medium or portion which defines the distance between the light receiving lens 15 and light projecting lens 16 causes thermal expansion and contraction with a coefficient of thermal linear expansion equal to that of the material of the member 19, for example, with $7.0 \times 10^{-5}/°C$. in case that the member 19 is made of PMMA. On the other hand, the light receiving element 17 and light emitting element 18 are respectively fixed to the frame 20 by a suitable means such as a binding agent so that each of them becomes integral with the frame 20. Therefore, the medium or portion which defines the distance between the light receiving element 17 and light emitting element 18 causes thermal expansion and contraction with a coefficient of thermal linear expansion equal to that of the material of the frame 20, for example, with $13.0 \times 10^{-5}/°C$. in case, that the frame 20 is made of ABS resin (copolymer of acrylonitrile butadiene and styrene). Consequently, when it is designed that the distance between the light receiving element 17 and light emitting element 18, i.e., the base length, is 42.5 mm at the normal temperature (20° C.) and the distance between the light receiving lens 15 and light projecting lens 16, i.e., the base length, is also 42.5 mm at the normal temperature (20° C.), the deviation $\Delta$ shown below occurs at the low temperature ($-10°$ C.) between said distances.

$$\Delta = (7.0 \times 10^{-5} - 13.0 \times 10^{-5}) \times (-10 - 20) \times 42.5 \approx -0.077 \text{ (mm)}$$

As a result, the change-over point of the position of the photographic lens system shifts toward the short object distance side by a value corresponding to the deviation $\Delta$. When the deviation $\Delta$ is converted into the amount of displacement of the focus point of the photographic lens system, it becomes 0.12 (mm) from the formula (4) in case that $f_J = 18.3$ mm and $f_S = 34.8$ mm. Therefore, it is possible to compensate the displacement of the focus point of the photographic lens system to be caused by temperature variation. The displacement of the focus point which occurs at the time of a high temperature is also compensated in the same way as above.

Figure 7:
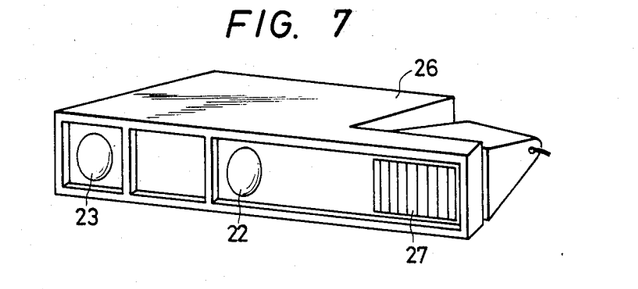
FIG. 7 shows a perspective view of Embodiment 4 of the present invention.
Figure 8:
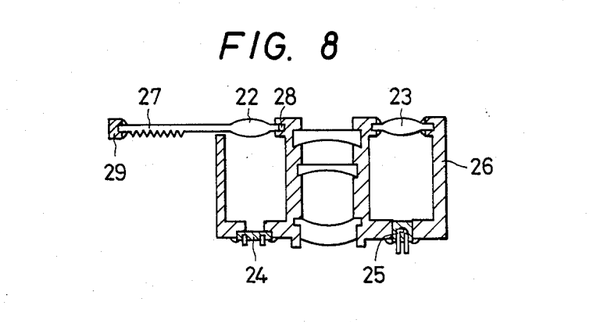
FIG. 8 shows a sectional view of Embodiment 4 of the present invention.

Embodiment 4 of the present invention is shown in FIGS. 7 and 8. This is another embodiment which is applicable to the photographic lens system shown in FIG. 16.

In said figures, numeral 22 designates a light receiving lens, numeral 23 designates a light projecting lens, numeral 24 designates a light receiving element, numeral 25 designates a light emitting element, and numeral 26 designates a frame.

In Embodiment 4, as it will be understood from FIGS. 7 and 8, the light emitting element 25 and light receiving element 24 are respectively fixed to the frame 26 by a suitable means such as a binding agent, and the light projecting lens 23 is also fixed to the frame 26 by a suitable means such as a binding agent. On the other hand, the light receiving lens 22 is held by a supporting member 30 which also has a light scattering plate 27 of an electronic flash. The supporting member 30 is mounted in the state that one end thereof on the side opposite to the light receiving lens side is fixed to a mounting portion 29 of the frame 26 which is extended toward the electronic flash side, and the other end thereof is inserted to a groove 28, which is provided to the frame 26, by leaving a suitable gap as shown in FIG. 8. Therefore, the light receiving lens 22 moves, according to thermal expansion and contraction of the supporting member 30 to be caused by temperature variation, in the direction of a straight line that interconnects the light projecting lens and light receiving lens, i.e., in the base length direction, by using the mounting portion 29 as the reference point.

As the light projecting lens 23 is fixed to the frame 26 and the light receiving element 24 and light emitting element 25 are also fixed to the frame 26, when the temperature varies, the light projecting lens 23 and light emitting element 25 do not cause any variation of the relative position thereof in the base length direction while the light receiving lens 22 and light receiving element 24 cause a variation of the relative position thereof in the base length direction. That is, by using the mounting portion 29 as the reference point, the position of the light receiving element 24 varies according to thermal expansion and contraction of the frame 26 which occur with the coefficient of thermal linear expansion of the material of the frame 26, for example, with the coefficient of $13.0 \times 10^{-5}$ mm/°C. in case that the frame 26 is made of ABS resin. On the other hand, the light receiving lens 22 moves, by using the mounting portion 29 as the reference point, according to thermal expansion and contraction of the supporting member 30 which occur with the coefficient of thermal linear expansion of the material of the supporting member 30, for example, with the coefficient of $7.0 \times 10^{-5}$/°C. in case that the supporting member 30 is made of PMMA. Therefore, when it is designed that the distance from the mounting portion 29 to the light receiving lens 22 is 42.5 mm at the normal temperature (20° C.), the center position of the light spot on the light receiving surface of the light receiving element 24 causes a deviation $\Delta$ shown below at the time of the low temperature ($-10°$ C.).

$$\Delta = (7.0 \times 10^{-5} - 13.0 \times 10^{-5}) \times (-10 - 20) \times 42.5 \approx 0.077 \text{ (mm)}$$

As a result, the change-over point of the position of the photographic lens system shifts toward the short object distance side by a value corresponding to the deviation $\Delta$. When the deviation $\Delta$ is converted into the amount of displacement of the focus point of the photogrpaphic lens system, it becomes 0.12 (mm) from the formula (4) in case that $f_J = 18.3$ mm and $f_S = 34.8$ mm. Therefore, it is possible to compensate the displacemet of the focus point of the photographic lens system to be caused by temperature variation. The displacement of the focus point which occurs at the time of a high temperature is also compensated in the same way as above.

In Embodiment 4 described so far, the supporting member 30 which holds the light receiving lens 22 is mounted to the frame 26. Here, it is also possible to arrange that one end of the supporting member 30 is fixed directly to the camera body (instead of the mounting portion 29 of the frame 26). Therefore, compared with Embodiments 1, 2 and 3 wherein the light projecting lens, light receiving lens, light emitting element and light receiving element are mounted to the frame, it is possible to freely select the shape, size, etc. of the supporting member 30 so that they become the most suitable for compensation of the displacement of the focus point of the photographic lens system to be caused by temperature variation. In other words, the range-finding optical system illustrated by Embodiment 4 has an advantage that it is applicable to a wider variety of types of photographic lens systems. Besides, in case of Embodiment 4, it is also possible to arrange that the frame is formed to have a boxtype shape in the same way as Embodiments 1, 2 and 3 and the supporting member 30 is mounted directly to the camera body.

Furthermore, in Embodiment 4, it is also possible to arranged that the light receiving lens 22 is fixed to the frame and the light projecting lens 23 is held by the supporting member 30.

As illustrated by respective embodiments described so far, it is evident that the range-finding optical system according to the present invention makes it possible to compensate the displacement of the focus point of the photographic lens system to be caused by temperature variation by defining or regulating the distance between the light emitting element and light receiving element and distance between the light projecting lens and light receiving lens by keeping said distances respectively in the state that said distances are not subject to the influence of thermal expansion and contraction from each other by means of the member in which both of said lenses are formed to be integral with said member in cases of Embodiments 2 and 3 and by means of the plate-like member made of fiberglass reinforced epoxy in case of Embodiment 2 and, at the same time, by arranging that the member which defines the distance between the light emitting element and light receiving element and member which defines the distance between the light projecting lens and light receiving lens are made of materials with respectively different coefficients of thermal linear expansion.

In case of Embodiment 4, the frame and the member, in which the light receiving lens is formed to be integral with a light scattering plate of an electronic flash, are used as the members which define the distance between the light projecting lens and light receiving lens, and Embodiment 4 is arranged to make it possible to attain the object of the present invention by using materials with respectively different coefficients of thermal linear expansion for the member in which the light receiving lens is formed to be integral with the light scattering plate of the electronic flash and for the member (the frame 26) which defines the distance between the light emitting element and light receiving element.

As it is evident from the description so far, the range-finding optical system according to the present invention makes it possible to materialize compensation of the displacement of the focus point of the photographic lens system by means of simple construction and at a low cost without using an additional or new component member, which is to be employed exclusively for the purpose of said compensation and, therefore, the range-finding optical system according to the present invention thereby makes it possible to adopt a lens made by forming of synthetic resin in a photographic lens system of a camera without losing the merits inherent to such lens.

We claim:

1. A range-finding optical system of a light projection type arranged that light emitted from a light emitting element is projected onto an object through a light projecting lens located in front of said light emitting element and said light reflected by said object is received by a light receiving element through a light receiving lens, said range-finding optical system comprising a supporting member for supporting and holding said light emitting element and said light receiving element by leaving a predetermined distance there between, and a supporting member for supporting and holding said light projecting lens and said light receiving lens by leaving a predetermined distance therebetween, said range-finding optical system being arranged so that said supporting member for supporting and holding said light emitting element and said light receiving element by leaving a predetermined distance therebetween and said supporting member for supporting and holding said light projecting lens and said light receiving lens by leaving a predetermined distance therebetween respectively have individually different coefficients of thermal linear expansion and that the displacement of the focus point of the photographic lens system to be caused by temperature variation is compensated by means of the difference between thermal expansion and contraction of the former supporting member and thermal expansion and contraction of the latter supporting member, wherein said light projecting lens and said light receiving lens are formed to be integral with a plate-like supporting member which interconnects said light projecting and said light receiving lens so as to maintain the distance between said lenses at a predetermined value and wherein said plate-like supporting member can freely expand and contract in the direction of a straight line that interconnects said light projecting lens and said light receiving lens.

2. A range-finding optical system according to claim 1 wherein said plate-like supporting member is inserted to grooves provided to said frame in the state that gaps are caused between said plate-like supporting member and said frame.

3. A range-finding optical system according to claim 2 further comprising a finder optical system located between said light projecting lens and said light receiving lens wherein a lens constituting said finder optical system is formed to be integral with said plate-like supporting member.

4. A range finding optical system of a light projection type arranged that light emitted from a light emitting element is projected onto an object through a light projecting lens located in front of said light emitting element and said light reflected by said object is received by a light receiving element through a light receiving lens, said range-finding optical system comprising a supporting member for supporting and holding said light emitting element and said light receiving element by leaving a predetermined distance therebetween, and a supporting member including a frame for supporting and holding said light projecting lens and said light receiving lens by leaving a predetermined distance therebetween, said range-finding optical system being arranged that said supporting member for supporting and holding said light emitting element and said light receiving element by leaving a predetermined distance therebetween and said supporting member for supporting and holding said light projecting lens and said light receiving lens by leaving a predetermined distance therebetween respectively have individually different coefficients of thermal linear expansion and that the displacement of the focus point of the photographic lens system to be caused by temperature variation is compensated by means of the difference between thermal expansion and contraction of the former supporting member and thermal expansion and contraction of the latter supporting member, and wherein said light projecting lens and said light receiving lens are respectively fixed to said frame so as to maintain the distance between said lenses at a predetermined value while said light emitting element and said light receiving element are respectively fixed to a plate-like supporting member so as to maintain the distance between said elements at a predetermined value and wherein said plate-like supporting member is held by said frame in the state that said plate-like supporting member can freely expand and contract in the direction of a straight line that interconnects said light emitting element and said light receiving element.

5. A range-finding optical system according to claim 4 wherein said plate-like supporting member is inserted to grooves provided to said frame in the state that gaps are caused between said plate-like supporting member and said frame.

* * * * *